United States Patent Office

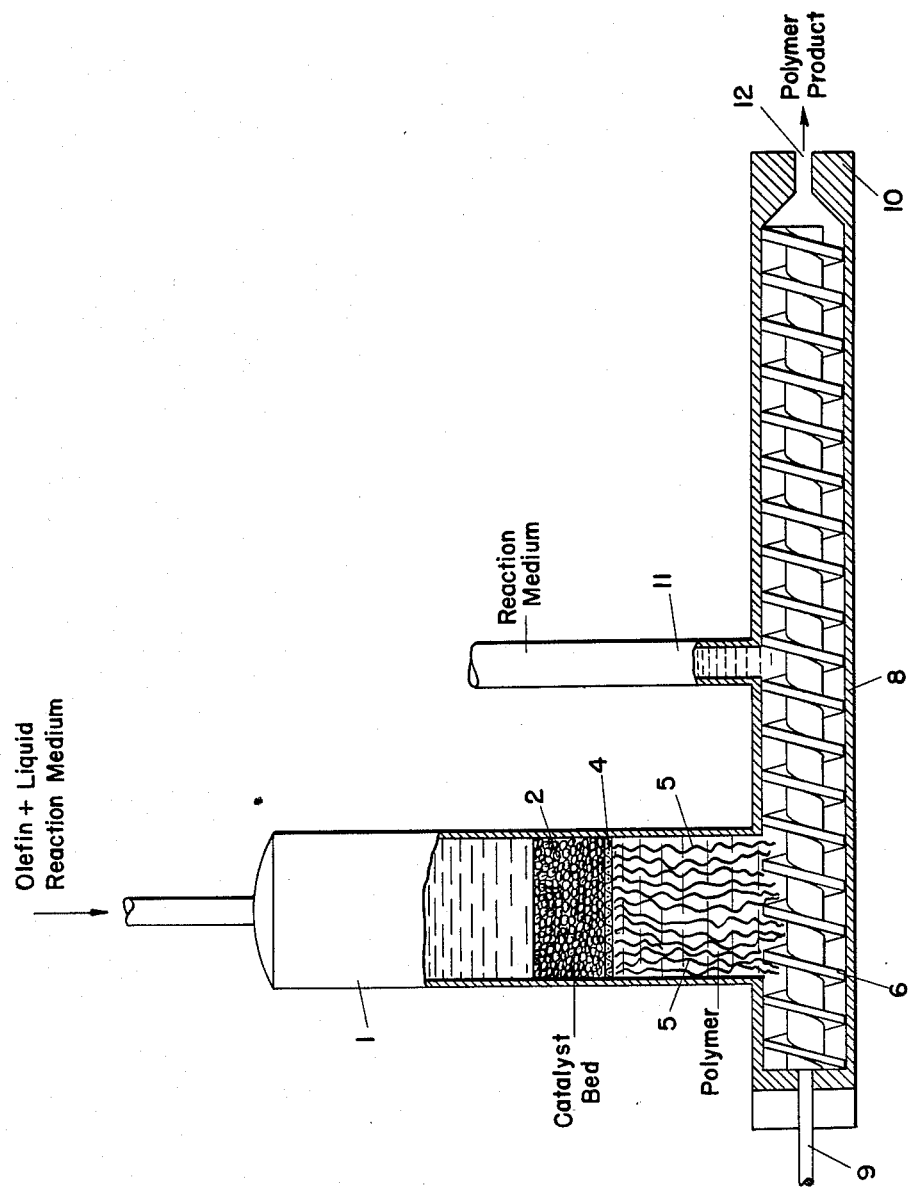

2,921,054
Patented Jan. 12, 1960

2,921,054

PROCESS FOR POLYMERIZING OLEFINS

Robert M. Kennedy, Newtown Square, Pa., assignor to Sun Oil Company, Philadelphia, Pa., a corporation of New Jersey Application June 25, 1957, Serial No. 667,743

6 Claims. (Cl. 260—88.2)

This invention relates to the preparation of polymers of normally gaseous olefins, and particularly relates to the preparation of solid polymers of ethylene, solid polymers of propylene, and solid copolymers of ethylene and propylene.

Normally gaseous olefins can be polymerized by a variety of catalysts. A catalyst which is especially effective for the polymerization of normally gaseous olefins to relatively high molecular weight, solid polymers is the combination of a lower halide of titanium, such as titanium trichloride and an aluminum trialkyl, such as aluminum triethyl. This catalyst can be prepared by admixing, for example, titanium tetrachloride and aluminum triethyl in an inert liquid such as isooctane. On admixing the two components, a finely divided solid phase is formed as a dispersion in the inert liquid. The solids of the dispersion are catalysts for polymerizing normally gaseous olefins to solid polymers. If desired, a lower halide such as titanium trichloride can be preformed, dispersed in an inert liquid, and an activator such as an aluminum trialkyl added. Such catalysts are deactivated by contact with water or oxygen, and hence such materials must be excluded from contact therewith. In performing the polymerization step, a normally gaseous olefin is contacted with a suspension of the finely divided solid in the inert liquid reaction medium and is therein polymerized to solid polymers. Other materials can be substituted for titanium tetrachloride and/or aluminum triethyl, as hereinafter described.

However, in this process the solid catalyst particles become coated by, or embedded in, the solid polymer product. The separation of polymer from catalyst, which is necessary in order to obtain a satisfactory polymer product, is extremely difficult. Means heretofore described for separating catalyst from polymer involve grinding the polymer-catalyst in the presence of a catalyst deactivating material such as water or alcohol to expose portions of the catalyst particles to the action of such deactivating material, and simultaneously or subsequently extracting the deactivated catalyst from the polymer such as with an alcoholic solution of a mineral acid. This separation means is unsatisfactory in that removal of even a major proportion of the catalyst is difficult and time consuming, and the catalyst is deactivated. Hence, such processes of necessity are batch-type and expensive.

An object of the present invention is to provide a process for the preparation of solid polymers of normally gaseous olefins, using solid catalyst particles which are destroyed by contact with water or oxygen, in which the polymer is continuously separated from catalyst without deactivating the catalyst. A specific object of the invention is to provide a continuous process for the preparation of polypropylene using a solid catalyst in which the catalyst is not deactivated and in which the polymer product is substantially free from catalyst. Other objects and their achievement in accordance with the process of the invention will be apparent hereinafter.

It has now been found, in the preparation of solid polymers of normally gaseous olefins involving the use of solid catalyst particles, as above described, that by orienting polymer growth outwardly from a stationary catalyst bed composed essentially of the solid catalyst particles, the polymer chains can be cleaved without disturbing the catalyst surface so that the cleaved polymer is free from contamination by catalyst particles, and the catalyst is active for further, or continued, olefin polymerization.

Ethylene, propylene, and mixtures of ethylene and propylene are the normally gaseous olefins which can be polymerized in accordance with the process of the present invention. Such olefins can be from any source, such as from petroleum refinery streams, the dehydration of alcohols, or the like. Saturated hydrocarbons such as ethane and propane can be present and act as diluents. For convenience, the process of the invention is herein largely described using propylene as illustrative of the normally gaseous olefins which can be used.

In United States patent application Serial Number 624,698, filed November 27, 1956, a process using centrifugal force to orient the growth of polymers formed from normally gaseous olefins outwardly from a catalyst bed maintained on the periphery of a basket centrifuge is described. In accordance with the process of the present invention, the growth of polymers of normally gaseous olefins is oriented outwardly from a stationary catalyst bed by flowing propylene, or a mixture thereof with another material such as an inert liquid medium, through a stationary catalyst bed. The so-oriented polymers can be cleaved without interfering with continued polymer growth or catalyst activity.

Attention is now directed to the accompanying figure which illustrates an embodiment of the process of the invention. Numeral 1 represents a conduit having stationary catalyst bed 2 positioned therein. Screen 4 provides support for bed 2. Strands or threads of polymer represented by 5 extend outwardly from catalyst bed 2. Numeral 6 represents a screw conveyor maintained in conduit 8. Screw conveyor 6 is rotated by shaft 9. Polymer product is removed through nozzle 10 having orifice 12. The inert liquid reaction medium and any unreacted or partially reacted olefin is removed from conduit 8 through conduit 11.

In operation, a solution of a normally gaseous olefin such as propylene in an inert, liquid reaction medium such as isooctane is introduced into conduit 1 wherein it flows downwardly through catalyst bed 2. Because of the velocity of the reaction medium through catalyst bed 2, polymer growth is oriented so that strands or chains of the polymer extend downwardly from the catalyst bed, passing through the catalyst bed support. It appears that the polymerization reaction of the present invention occurs by way of olefin monomers entering into the polymer chain at a location adjacent the catalyst surface, so that cleavage of polymer strands does not affect subsequent polymerization, and in the event that strands are cleaved from the catalyst bed, an active catalytic surface remains where additional polymerization can occur. The polymer fibers continue to grow until they contact screw conveyor 6. Cutting means or the like (not shown) can be combined with the screw conveyer if desired. The screw conveyor conducts the separated polymer along conduit 8 to the direction of nozzle 10. Substantially all of the inert reaction medium and unreacted or partially reacted olefin is separated prior to nozzle 10 such as through conduit 11. Advantageusly, this separated material is recycled to the process, together with make-up ingredients as necessary. The polymer, under pressure from the screw conveyor, is forced through orifice 12 of nozzle 10, so that a desired form of the polymer product can be prepared. However, the shape of nozzle 10 does not form a part of this invention, and the nozzle can be omitted if desired.

Various alterations, modifications and additions to the apparatus as described will be apparent to those skilled in the art. For example, separating means for removing polymer from the catalyst bed other than a screw conveyor can be employed, and other separating means for removing the liquid reaction medium from polymer can be used.

In another embodiment of the process of the invention, polymer growth is oriented outwardly from a stationary catalyst bed by passing propylene through the catalyst bed. For example, a catalyst bed is formed on a sintered glass disk as a support. An inert, liquid reaction medium is introduced into the reaction vessel above and in contact with the catalyst bed. Propylene is then introduced into the reaction vessel below the catalyst bed. The sintered glass catalyst bed support serves to diffuse the propylene throughout the catalyst bed. The velocity of the propylene through the catalyst bed orients polymer growth upwardly from the catalyst bed so that the polymer chains extend into the inert reaction medium. The polymer chains extending upwardly from the catalyst bed can be removed continuously or intermittently such as by cutting or other means. In some instances sufficient turbulence can be obtained so that after reaching a certain length, the polymer chain breaks and floats to the surface of the reaction medium where it is removed from the process. In this embodiment, the space below the catalyst can be filled or partially filled with inert, liquid reaction medium, or more preferably by the propylene passing upwardly through the bed. The quantity of propylene passed through the catalyst bed must be sufficient so that the velocity thereof orients polymer growth, i.e., an excess of propylene must be used. Unreacted propylene can be recovered or recycled to the process.

The catalyst bed is formed on a support therefor. The catalysts of the invention are solid particles formed by the reduction of a halide or salt of a metal of the left hand side of groups IV, V or VI of the periodic table. Preferably, a subhalide or salt of titanium, zirconium, hafnium, vanadium, niobium, chromium, molybdenum or tungsten is used. The metal of the metal compound must be in a valence state other than its highest valence state. The reduction of such a metal compound, such as titanium tetrachloride, can be accomplished by any convenient means, such as by contacting with a dispersion of an alkali metal in a solvent, or by contacting with an aluminum trialkyl. In any event, it is necessary that an activator, such as an aluminum trialkyl, be present together with the catalyst, and it is convenient in many instances to employ such a compound as both the reducing agent and the activator. However, the use of a prereduced compound, such as $TiCl_3$, $TiCl_2$, or a mixture thereof, together with an activator, gives excellent results. Materials which can be used as the activator, in addition to aluminum trialkyls, include other metal alkyls, metal hydrides, metal borohydrides, and alkyl metal halides. Suitable metal alkyls include alkyl derivatives of aluminum, zinc, berylium, chromium, magnesium, lithium and lead. Aluminum triethyl, aluminum triisopropyl, aluminum triisobutyl, and the magnesium and zinc analogues thereof give good results in the process and are preferred, but metal alkyls having up to about 12 carbon atoms in the alkyl groups can be used with good results. Alkali metal alkyls such as n-butyllithium, methylsodium, butylsodium, phenylisopropylpotassium, and the like, also illustrate metal alkyls that give good results in the process. Metal hydrides which can be used as polymerization activators include, for example, lithium hydride, lithium aluminum hydride and sodium hydride. Metal borohydrides such as sodium borohydride and potassium borohydride illustrate the borohydrides which can be used. Alkyl metal halides which can be used as Grignard reagents such as methylmagnesium bromide, ethylmagnesium chloride, phenylmagnesium bromide, and the like.

The catalyst bed can be formed by positioning a catalyst support such as a wire mesh, sintered glass plate, or a perforated metal disk within the conduit in which polymerization is performed. A slurry of solid catalyst particles is then passed through the support so that the solid catalyst particles are collected on the support as a bed. It is advantageous to position a support above the bed so that the solid catalyst particles are held in position in the bed. If desired, the catalyst can be deposited on a carrier such as alumina, carbon, silica-alumina compositions, or the like. Such deposition can be accomplished, for example, by impregnating the support with titanium tetrachloride, or a solution thereof in a solvent, and contacting the impregnated carrier with a reducing agent such as an aluminum trialkyl. The activator for the catalyst particles, as above described, is preferably introduced as a solution together with the olefin to be polymerized in the inert, liquid reaction medium. However, periodic activation rather than continuous activation can be used with good results. The quantity of activator to use can be varied substantially and good results obtained. It is preferred initially to contact the catalyst bed with a quantity of activator so that the mole ratio of activator to catalyst is from about 0.5:1 to 10:1, and to thereafter introduce, continuously or intermittently, a small quantity of the activator to maintain a rapid rate of polymerization.

The polymerization reaction is performed under polymerizing conditions of temperature and pressure. The temperature can be varied from about 0° C. to about 150° C., and ambient temperature gives good results, but preferably the temperature is maintained in the range of from about 60° C. to 100° C. The pressure is advantageously atmospheric or above, and a pressure of from about 10 to 5,000 p.s.i.g. (pounds per square inch gauge) gives good results when the olefin dissolved in reaction medium is passed through the catalyst bed, since the solubility of the olefin in the reaction medium is increased by the elevated pressure. The pressure must be sufficient to maintain the inert, liquid reaction medium in the liquid phase at the temperature employed.

Saturated hydrocarbons are preferably used as the inert, liquid reaction medium. Paraffins such as the hexanes, heptanes, octanes, decanes, and mixtures thereof give good results. Cycloparaffins, such as the cyclopentanes, and cyclohexanes, and mixtures thereof with each other and with paraffins also give good results.

The following example illustrates an embodiment of the process of the invention in which "parts" refers to parts by weight.

A sintered glass disk about 2 inches in diameter and about 3/16 inch thick was positioned in a glass tube having a diameter of about 2 inches. After drying and removing oxygen from the apparatus, 1.27 parts of titanium trichloride were introduced into the glass tube to form a bed about 3/16 inch thick on the sintered glass support, this introduction being accomplished under a nitrogen atmosphere. A 325 mesh screen (U.S. series) of copper wire was positioned over the catalyst bed. Into the tube above the catalyst were introduced 350 cc. of n-heptane, and 10.1 cc. of a 10% solution of aluminum triisobutyl in n-heptane. The temperature of the apparatus and contents was adjusted to 71° C. Propylene was then introduced into the bottom of the glass tube. The propylene passed upwardly through the sintered glass disk and the catalyst bed. The pressure of the apparatus was adjusted to 73 p.s.i.g. After about 15 minutes, polymer chains appeared growing upwardly from the catalyst bed, through the screen, and into the n-heptane. The rate of propylene addition was regulated so that a concentration thereof of about 15 mole percent in the n-heptane was maintained, which amount was an excess sufficient to cause vigorous agitation while passing through the n-heptane. After 3⅓ hours, a multiplicity of long polymer chains had grown upwardly into the n-heptane. A portion of these chains were cleaved by the agitation of the propylene, and passed to the top of the apparatus. Such cleavage did not interfere with subsequent polymerization, and the so-removed polymer formed a portion of the polymer product. The polymer product was a white, crystalline solid having a melting point of about 164° C. and was substantially free of contamination by the metals of the catalyst.

As above described, polymerization can be continued over a long period of time with the polymer preferably continuously removed from the catalyst bed. However, after long operation, the catalyst bed may become fouled by polymer so that passage therethrough of liquid and/or gas is difficult. In such event, operation is discontinued and a solvent, which is preferably a saturated hydrocarbon, passed through the bed at an elevated temperature of say from about 150° C. to 200° C., and a pressure sufficient to maintain the solvent in the liquid phase. The polymer adhered to the catalyst bed is thereby dissolved and is removed from the bed. Saturated hydrocarbons such as the heptanes, octanes, decanes, cyclohexanes, decahydronaphthalene and the like give good results. After regenerating the actalyst bed by washing, a quantity of activator should be contacted with the catalyst bed before continuing the polymerization.

The polymer products of the invention are useful in the form of thin films for packaging, for preparing conduits for transporting liquids, as containers for corrosive liquids, and the like. Such articles can be prepared by extrusion, molding, or other fabrication means.

The invention claimed is:

1. Process for the preparation of solid polymers of normally gaseous olefins which comprises flowing, under polymerizing conditions, a normally gaseous olefin through a stationary bed of solid catalyst particles of a metal subhalide selected from the group consisting of the subhalides of the metals of groups IV, V and VI of the periodic table in contact with an aluminum trialkyl for the catalyst particles and an inert, liquid reaction medium, whereby polymer chains of said normally gaseous olefin extending outwardly from said catalyst bed in the direction of olefin flow are formed, cleaving the so-formed polymer chains from the catalyst bed and recovering the polymer.

2. Process according to claim 1 wherein said normally gaseous olefin is ethylene.

3. Process according to claim 1 wherein said normally gaseous olefin is propylene.

4. Process according to claim 1 wherein said normally gaseous olefin is a mixture of ethylene and propylene.

5. Process for the preparation of solid polymers of propylene which comprises flowing, under polymerizing conditions, propylene through a stationary bed of solid catalyst particles consisting essentially of a metal subhalide selected from the group consisting of the subhalides of the metals of groups IV, V, and VI of the periodic table in contact with an aluminum trialkyl and an inert liquid reaction medium whereby chains of polypropylene extending outwardly from the actalyst bed in the direction of propylene flow are formed, and cleaving said chains to recover polypropylene.

6. Process according to claim 5 wherein the catalyst is titanium trichloride.

References Cited in the file of this patent

UNITED STATES PATENTS

| | | |
|---|---|---|
| 1,985,457 | Nutting et al. | Dec. 25, 1934 |
| 2,088,929 | Scharff et al. | Aug. 3, 1937 |
| 2,392,798 | Kleiss | Jan. 8, 1946 |
| 2,416,003 | Guyer | Feb. 18, 1947 |
| 2,459,480 | Welty et al. | Jan. 18, 1949 |
| 2,727,023 | Evering et al. | Dec. 13, 1955 |

FOREIGN PATENTS

| | | |
|---|---|---|
| 538,782 | Belgium | Dec. 6, 1955 |